United States Patent
Li et al.

(10) Patent No.: US 10,126,191 B2
(45) Date of Patent: Nov. 13, 2018

(54) CAPACITIVE PRESSURE SENSING USING IONIC FILM SENSORS

(71) Applicants: TacSense, Inc., Woodland, CA (US); The Regents Of The University Of California

(72) Inventors: Ruya Li, Davis, CA (US); Baoqing Nie, Davis, CA (US); Zijie Zhu, Davis, CA (US); Tingrui Pan, Woodland, CA (US)

(73) Assignees: The Regents of the University of California, Oakland, CA (US); TacSense, Inc., Woodland, CA (US)

( * ) Notice: Subject to any disclaimer, the term of this patent is extended or adjusted under 35 U.S.C. 154(b) by 199 days.

(21) Appl. No.: 15/249,453

(22) Filed: Aug. 28, 2016

(65) Prior Publication Data

US 2017/0059434 A1   Mar. 2, 2017

Related U.S. Application Data

(60) Provisional application No. 62/211,630, filed on Aug. 28, 2015.

(51) Int. Cl.
| | |
|---|---|
| *G01L 1/14* | (2006.01) |
| *G01L 5/00* | (2006.01) |
| *G01L 9/12* | (2006.01) |
| *G01L 9/00* | (2006.01) |

(52) U.S. Cl.
CPC .................. *G01L 9/0072* (2013.01)

(58) Field of Classification Search
CPC ... G01L 1/00; G01L 1/14; G01L 1/146; G01L 5/00; G01L 9/0072; G01L 9/12; G06F 3/044; G06F 2203/04103
See application file for complete search history.

(56) References Cited

U.S. PATENT DOCUMENTS

| | | | |
|---|---|---|---|
| 2014/0152621 A1* | 6/2014 | Okayama | G06F 3/0416 345/174 |
| 2014/0174189 A1* | 6/2014 | Pan | G01L 9/0072 73/724 |
| 2014/0327843 A1* | 11/2014 | Liu | G02F 1/13338 349/12 |
| 2016/0365198 A1* | 12/2016 | Pan | G01L 1/02 |
| 2017/0139527 A1* | 5/2017 | Nathan | G06F 3/0418 |

* cited by examiner

*Primary Examiner* — Nguyen Ha
(74) *Attorney, Agent, or Firm* — Kurt T. Mulville, Esq.; VLP Law Group, LLP

(57) ABSTRACT

Thin-film pressure sensors are disclosed herein. Such sensors include one or more electrodes in contact with a sensing material. As the sensor deforms the capacitance of the sensor varies and is measurable either between two electrodes of the sensor, or between the one electrode of the sensor and an electrode formed by the surface to which the sensor is applied, such as skin. The sensing material can be an ionic material such as an ionic composite including an ionic liquid.

8 Claims, 7 Drawing Sheets

CAPACITIVE PRESSURE SENSING USING IONIC FILM SENSORS

CROSS-REFERENCE TO RELATED APPLICATIONS

This application claims priority to U.S. provisional patent application No. 62/211,630 filed Aug. 28, 2015 which is incorporated herein by reference in its entirety.

STATEMENT REGARDING FEDERALLY SPONSORED RESEARCH OR DEVELOPMENT

This invention was made with Government support under NSF Awards Nos. ECCS-1307831 and IIP-1451056 awarded by the National Science Foundation. The Government has certain rights in this invention.

BACKGROUND

Field of the Invention

The invention is in the field of pressure sensing devices, and more particularly to flexible thin-film sensors for application in medical devices, wearable devices, and the like.

Related Art

Pressure sensors based on an enclosed droplet are known, such as are disclosed in U.S. Pat. No. 9,170,166 Droplet-Based Capacitive Pressure Sensor. In that patent, electrolyte droplets are placed on hydrophobic-modified electrodes.

SUMMARY

The present invention is directed to thin film pressure sensors, devices incorporating the same, and methods for their fabrication and use. An exemplary sensor of the present invention comprises a housing defining a cavity therein, the housing including a top layer disposed between the cavity and the external environment of the housing, the top layer including a first membrane having an electrically conductive surface facing the cavity. The sensor also comprises a layer of a sensing material within the cavity, the sensing material being in contact with the electrically conductive surface of the first membrane. The sensing material can optionally be a solid, a liquid, or a composite material. In various embodiments the sensing material comprises an ionic material such as a composite of a hydrogel matrix and an ionic liquid like 1-ethyl-3-methylimidazolium tricyanomethanide.

In some embodiments, the top layer of this exemplary sensor further includes a first electrically conductive layer and at least part of the first electrically conductive layer provides the electrically conductive surface of the first membrane. In further embodiments the first electrically conductive layer comprises indium tin oxide or graphene, for example. In still other embodiments, the at least part of the first electrically conductive layer that provides the electrically conductive surface is patterned, to provide a pair of electrodes in a single layer, for example.

In some embodiments of this exemplary sensor, the housing further includes an intermediate layer joined to the top layer, where the intermediate layer includes an aperture that defines the cavity. In some of these embodiments, the housing further includes a bottom layer, and the intermediate layer is disposed between the top layer and the bottom layer. The bottom layer, in some of these embodiments, further includes an electrically conductive surface that faces, across the cavity, the electrically conductive surface of the first membrane. And in some of those embodiments, the bottom layer further includes a second electrically conductive layer, where at least part of the second electrically conductive layer provides the electrically conductive surface of the bottom layer. In further embodiments including the bottom layer, the bottom layer includes a second membrane disposed between the cavity and the external environment of the housing.

Another exemplary sensor of the present invention consists of, or consists essentially of, a three-layer assembly of a substrate layer, a sensing material layer including an ionic material, and a conductive material layer in contact with the sensing material layer. In some of these embodiments the conductive material layer is patterned to form two electrically isolated portions to provide two separate electrodes in one layer. In additional embodiments, the conductive material layer is disposed between the substrate layer and the sensing material layer, or the sensing material layer is disposed between the substrate layer and the conductive material layer.

Yet another exemplary sensor of the present invention consists of, or consists essentially of, a conductive material layer; and a sensing material layer including an ionic material in contact with the conductive material layer. In some embodiments the sensing material layer comprises a plurality of coated conductive strands, wherein the coating on the strands comprises the ionic material, and in some of these embodiments the plurality of strands comprises a fabric. In other embodiments, the sensing material layer comprises a coated tape, wherein the coating on the tape comprises the ionic material.

Still another exemplary sensor of the present invention comprises a flexible housing defining a cavity therein, the cavity bounded by two opposing surfaces each having approximately a same surface area and spaced apart by a height of the cavity, one of the surfaces being electrically conductive. This exemplary sensor further comprises a sensing material within the cavity, where the sensing material comprises an ionic material and is in contact with the electrically conductive surface. In some of these embodiments the ionic material comprises a liquid, and in some of these embodiments the sensor further includes an anchor within the cavity, where the anchor, a protrusion or surface modification, serves to hold the sensing material in place within the cavity. Some of the embodiments further comprise an electrically conductive layer disposed within the cavity and in contact with one of the two opposing surfaces, where the electrically conductive layer provides the electrically conductive surface. In some of these latter embodiments the electrically conductive layer is patterned to include a gap within the cavity such that the electrically conductive layer includes two electrically isolated portions to serve as separate electrodes.

An exemplary method of the present invention comprises a first step of providing a bottom layer including an electrically conductive surface on a first side of the bottom layer, and a second step of forming a sensing material on the electrically conductive surface, the sensing material comprising an ionic material. The step of providing the bottom layer including the electrically conductive surface optionally includes forming an electrically conductive material layer on a first flexible material layer. In various embodiments forming the sensing material includes mixing an ionic liquid, such as 1-ethyl-3-methylimidazolium tricyanomethanide, with a pre-polymer solution then photo-crosslinking the pre-polymer. Forming the sensing material can also include impregnating a porous structured material with an ionic liquid. In these latter embodiments the porous structured material can comprise a micro-structured polymer matrix, a hollow sphere foam, a fabric, or paper.

In various embodiments of the exemplary method the method further comprises a step of forming, on the first side of the bottom layer, an intermediate layer including an aperture therein, the aperture defining a cavity such that the cavity exposes at least part of the electrically conductive surface. In some of these embodiments the method further comprises forming a top layer on the intermediate layer, and in some of these embodiments forming the top layer on the intermediate layer includes forming a conductive surface on a first side of a second flexible material layer to form the top layer, then joining the top layer to the intermediate layer such that the first side of the second flexible material layer faces the first side of the bottom layer.

DETAILED DESCRIPTION OF THE INVENTION

Highly sensitive, flexible, thin-film pressure sensors are disclosed herein. The sensors of the present invention include an ionic material and one or more electrodes, and as the sensor deforms in response to an applied pressure, the capacitance of the sensor varies and is measurable either between two electrodes of the sensor, or between a single electrode of the sensor and an electrode formed by the surface to which the sensor is applied. The sensors of the present invention provide highly responsive sensing for use, for example, in sensors for various emerging wearable and health sensing applications. Embodiments disclosed herein are capable of responding to a variable load varying at up to 500 Hz, demonstrating a response time of less than 1 millisecond, at least ten times more responsive than other known flexible capacitive sensors. It is further noted that the pressure sensors of the present invention also exhibit excellent mechanical stability and mechanical ruggedness. In some embodiments, the materials within the sensor are themselves transparent, making for a transparent sensor.

Figure 1:
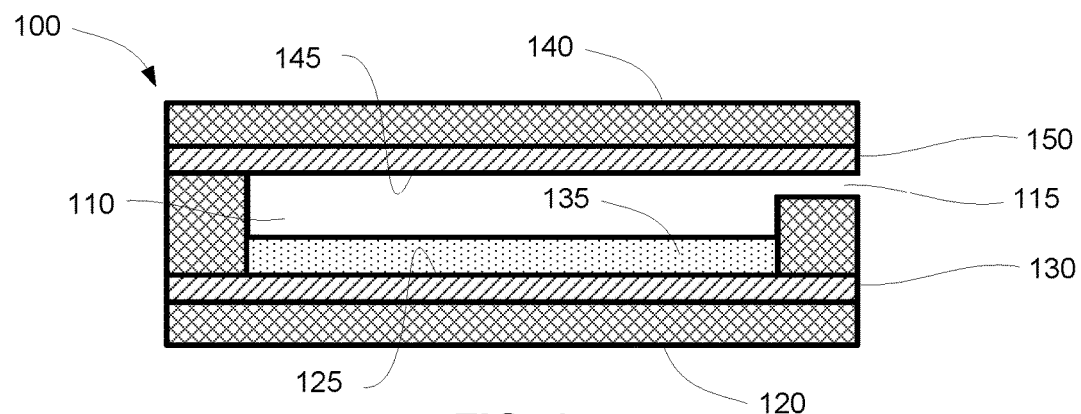
FIG. 1 is a cross-sectional view of a sensor according to an exemplary embodiment of the present invention.
Figure 2:
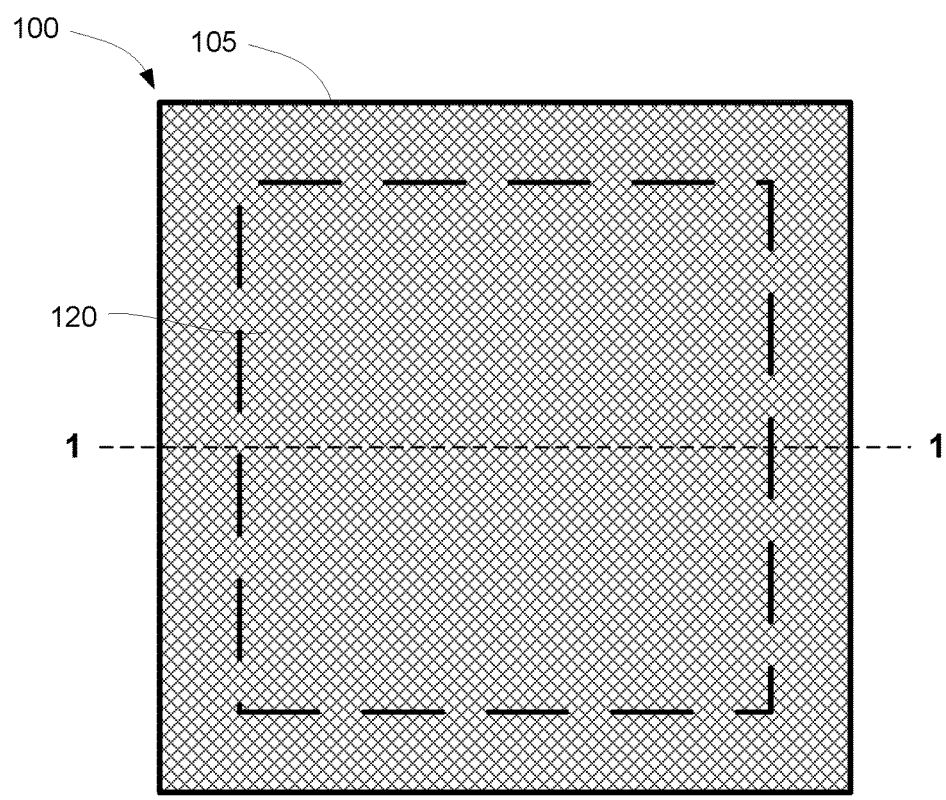
FIG. 2 is bottom view of the exemplary embodiment of FIG. 1.

FIGS. 1 and 2 illustrate an exemplary sensor 100 of the present invention in cross-section and bottom view, respectively, with the cross-section of FIG. 1 being taken along the line 1-1 in FIG. 2. The sensor 100 comprises a housing 105 defining a cavity 110 therein. While the embodiment shown is generally shaped as a square in FIG. 2, it will be understood that the structures disclosed herein can readily be implemented as circles and other shapes, including customized shapes meant to conform to parts of the body. Exemplary diameters for circular sensors 100 are in the range of 1 mm to 6 mm, such as 2 mm, 3 mm, 4 mm, and 5 mm, but can also be larger or smaller than these diameters depending on the application. These same lengths apply also to the lengths of the sides of both square and rectangular sensors 100. The cavity 110 optionally includes one or more vents 115, as shown in FIG. 1, but can also be completely sealed from the external environment. A vent 115 can improve sensitivity in some embodiments, but a sealed cavity 110 may be preferred for certain applications, such as for use under water, for implantation within the body, or for use in humid environments. Other sensor embodiments in which the cavity is open on one side to the external environment, or that lack a cavity, are discussed below.

The housing 105 includes a first membrane 120 composed of a flexible and electrically insulating material disposed between the cavity 110 and the external environment of the housing 105. Optionally, the material can be optically transparent. In various embodiments the housing 105 and membrane 120 are formed of the same material. Exemplary materials for the housing 105 and/or membrane 120 include glasses, such as $SiO_2$ glass, which can be made ultrathin by chemical vapor deposition, for example, and polymers such as Avatrel, PPA BCB (Benzocyclobutene), silicone (PDMS), polyimide, PET, SU-8, and PMMA, and even double sided adhesive. Exemplary thicknesses for the membrane 120 can range from 75 µm to 175 µm, for instance 100 µm, 125 µm, and 150 µm, but can be either thinner or thicker than this range in various embodiments.

The membrane 120 also includes an electrically conductive surface 125 facing the cavity 110. The electrically conductive surface 125 can be provided in a number of ways, for example by an activated surface that provides electrical conduction or by a layer of a flexible and electrically conductive material, such as a thin film of indium tin oxide (ITO), formed on the side of the membrane 120 facing the cavity 110. Where the membrane 120 comprises the emeraldine form of polyaniline, for example, the surface of the membrane 120 can be made electrically conductive by protonic doping which activates the surface to a different oxidation state. In the example of FIG. 1 the electrically conductive surface 125 is provided, instead, by an electrically conductive layer 130 that extends beyond the footprint (shown in FIG. 2 as a dashed square) of the cavity 110 in order to provide an electrical contact (not shown) outside of the cavity 110. In other embodiments the electrically conductive layer 130 is coextensive with the cavity 110, such as when the housing 105 is integrally formed. The conductive layer 130 optionally is also optically transparent.

Other exemplary materials that can provide an electrically conductive layer 130 include metals such as gold, aluminum, copper, silver, and so forth, alloys thereof, liquid metals, such as mercury, gallium alloys, etc., electrically conductive metallic and non-metallic particles and nanostructures like single atomic layer sheets, nanotubes, nanoparticles, and nanowires, such as carbon black, graphene, carbon nanotubes, carbon fullerenes, and nanowires of zinc oxide, indium oxide, germanium silicide, gallium arsenide, etc., and thin films of electrically conductive compounds of which ITO is an example. Also suitable are certain organic conductive materials, such as conductive polymers like poly(3,4 ethylenedioxythiophene), polystyrene sulfonate (PEDOT:PSS), polyaniline (PANI), and poly(3-hexylthiophene-2,5-diyl) (P3HT)). Combinations of these can also be used.

Sensor 100 further comprises a layer of a sensing material 135 within the cavity 110 and in physical and electrical contact with the electrically conductive surface 125 of the membrane 120. The sensing material 135 needs to be both highly electrically conductive to permit a large interfacial capacitance, and possess sufficient mechanical strength to ensure structural stability. The sensing material 135 is optionally also optically transparent. Accordingly, the sensing material 135 comprises, in some embodiments, an ionic material. Ionic materials, as used herein, are defined as solids, liquids, or composites capable of providing an ionic conductance therethrough. Ionic liquids are one form of an ionic material and are defined herein as salts in a liquid state. Ionic liquids are distinguishable from salt solutions consisting of a dissolved salt in water, which are also examples of ionic materials in the liquid state. Ionic polymers are an example of an ionic material that can exist in either a liquid or a solid phase. Ionic polymers are defined as polymers which contain both covalent and ionic bonds in their molecular structure; ionic polymers can be either organic or inorganic.

Another solid ionic material are ionic composites, which are composite materials including both a porous solid matrix material and a liquid ionic material disposed within the interstitial spaces of the matrix material, where the ionic conductance is provided through the interstitial liquid phase. Some matrix materials are comprised of organic materials including polymers such as polyethylene glycol (PEG) gel, polyvinylidene difluoride (PVDF), poly(vinylidenefluoride-hexafluoropropylene) (PVDF-HFP), and Nafion. Another suitable matrix material is an absorptive hydrogel such as agar gel. An exemplary liquid for use in such ionic composites is 1-ethyl-3-methylimidazolium tricyanomethanide which is an ionic liquid and can provide, in some embodiments, an ionic conductivity of 18 mS cm$^{-1}$. This ionic liquid is additionally suitable for use in ionic composites for the present applications due to the liquid's negligible vapor pressure. As used herein, gels and composites made from gels are considered to be examples of solids.

Other suitable matrix materials for use in ionic composites include porous structured materials like micro-structured polymer matrixes, hollow sphere foams, fabrics, and paper. In some instances, such as with fabrics and paper, an ionic liquid is coated onto a surface of the matrix material and by capillary action, for example, becomes disposed within the interstitial spaces to form an ionic composite. Foams and paper can be dip coat with ionic materials. A polymer gel itself can be fabricated into a foam. In some embodiments, an ionic polymer is electro-spun to form strands that can be woven into fabrics. Common fabrics (e.g., cotton, Nylon, etc.) can also be dip coated with liquid ionic materials.

In operation, pressure applied to the sensor 100 deforms the housing 105, the membrane 120 and the sensing material 135; the deformation of the membrane 120 and the electrically conductive surface 125, the sensing material 135, and the interface between the electrically conductive surface 125 and the sensing material 135 affects the capacitance of the sensor 100 as measured between two electrodes of the sensor 100, or between one electrode of the sensor 100 and a surface to which the sensor 100 is applied, that surface acting as a second electrode. More specifically, sensors of the invention correlate applied pressure to the interfacial capacitance of an electrical double layer (EDL) formed where the sensing material 135 contacts the electrically conductive surface 125 such that electrons on the electrically conductive surface 125 and counter ions from the sensing material 135 accumulate and attract each other at a nanoscopic distance, producing an ultrahigh unit-area capacitance. Embodiments that utilize an ionic material as the sensing material 135 can offer a unit-area capacitance of up to 5.4 µF cm$^{-2}$, among the highest known among all solid-state capacitive sensors. Consequently, the embodiments yield an ultrahigh mechanical-to-capacitive sensitivity of 3.1 nF kPa$^{-1}$, which is more than a thousand time greater than that of traditional solid-state counterparts.

In further embodiments the housing 105 further comprises a second layer 140 generally parallel to the membrane 120 such that the second layer 140 covers the cavity 110, and in some of these embodiments the second layer 140 also comprises a membrane. When the cavity 110 is covered in this manner, the cavity 110 can be thought of as a chamber which can either be completely sealed or open to the external environment through a vent 115. In various embodiments, the second layer 140 of the housing is formed of the same material as the membrane 120. The second layer 140 optionally also includes an electrically conductive surface 145 facing the cavity 110. Like the electrically conductive surface 125, the electrically conductive surface 145 can be provided by an activated surface or a layer of a flexible and electrically conductive material, such as those suitable for conductive surface 125, formed on the side of the second layer 140 facing the cavity 110. In further embodiments, discussed below, second layer 140 does not include a conductive surface 145 to serve as a second electrode, rather, two electrodes are formed in a single layer (see FIG. 11).

In the example of FIG. 1 the electrically conductive surface 145 is provided by an electrically conductive layer 150 that extends beyond the footprint of the cavity 110 in order to provide a second electrical contact (not shown) outside of the cavity 110. In other embodiments the electrically conductive layer 150 is coextensive with the footprint of the cavity 110, or even smaller than the footprint, such as when the housing 105 is integrally formed, and the same can be true also for the electrically conductive surface 125. In these embodiments, electrical connections to outside of the cavity 110 can be made through conductive traces that extend through a vent 115, for example. In those embodiments that include the second layer 140, the sensing material 135 does not make contact with the second layer 140, or the electrically conductive surface 145 when the sensor 100 is in an undeformed state, but upon application of a load beyond a threshold the sensor 100 will deform enough for contact to be made.

Figure 3:
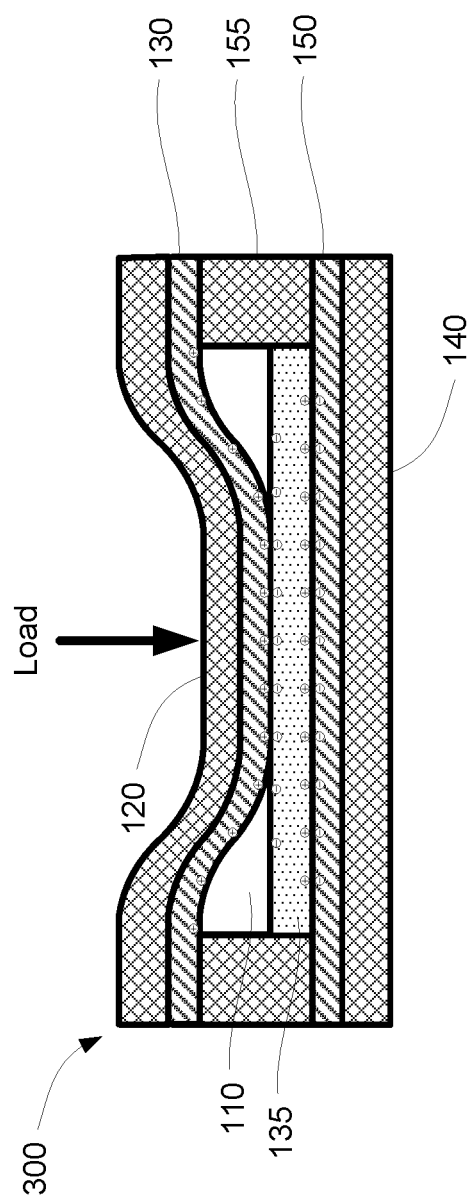
FIG. 3 is cross-sectional view of a sensor according to another exemplary embodiment of the present invention, showing deformation.

In some embodiments, the second layer 140 is more rigid than the membrane 120, for example by being thicker or by being made from a different, stiffer material. In further embodiments, the sensing material 135 is disposed on the second layer 140 instead of the membrane 120, as shown by the sensor 300 of FIG. 3. FIG. 3 also illustrates that under an external load beyond the threshold, the membrane 120, and optionally the entire sensor 100, mechanically deforms and then contact occurs between the sensing material 135 and the opposing electrically conductive surface 125. The interfacial capacitance of the electrical double layer (EDL) formed by the contact can be detected electronically. As the external load rises, the contact area increases, which increases the capacitance of the EDL. That capacitance is essentially proportional to the contact area at a given temperature. According to the Gouy-Chapman-Stern model, this interface without electrochemical activation can be simply modeled as a capacitive element, and accordingly, the entire device setup can be viewed as a variable capacitor of the EDL ($C_{EDL}$) connected in series with fixed capacitive and resistive elements from the electrically conductive layer(s) 130, 150 and interfaces, which has been illustrated by an equivalent circuit diagram shown in FIG. 4.

Some embodiments the sensor 100 that include second layer 140 further include an intermediate layer 155 that serves to provide separation between the membrane 120 and second layer 140. In these embodiments, the intermediate layer 155 includes an aperture that defines the footprint of the cavity 110, while the thickness of the intermediate layer 155 defines the transverse dimension of the cavity 110. The intermediate layer 155 can be formed from the same material as either or both of the membrane 120 and second layer 140, or of a different material than either.

An exemplary sensor 100 can comprise two 75 µm thick layers each formed of a polyethylene terephthalate/PET film coated with a 100 nm-thick ITO layer with a cavity 110 defined between the two ITO layers with the separation provided by an intermediate layer; the cavity 110 in this embodiment has a 4 mm diameter, a height measured in the transverse direction of 30 µm, and an ionic material disposed on one of the ITO layers within the cavity 110. This embodiment is characterized by a pressure sensitivity of 1.5 nF kPa$^{-1}$ below 8 kPa. Another exemplary sensor 100 of the same construction and dimensions, except for a 1 mm diameter cavity 110, is characterized by a pressure sensitivity of 0.018 nF kPa$^{-1}$. A sensor 100 with a smaller diameter cavity 110 will exhibit a greater detection range (up to 750 kPa), whereas a larger sensing chamber diameter of 6 mm can detect a lower pressure range of 1 kPa-13 kPa. Furthermore, the dynamic range can also be tuned by adjusting the height of the cavity 110, where a higher chamber (of 170 µm) exhibits a pressure threshold of 11 kPa and dynamic range of 11 kPa-18 kPa, while the lower chamber (of 75 µm) has a smaller pressure threshold of 1 kPa and a dynamic range of 1 kPa-13 kPa. Briefly, the sensitivity and dynamic range of sensor 100, as well as the other embodiments described below, can be influenced by the structural design parameters, which allows for a highly customized design for a wide range of applications.

Figure 5:
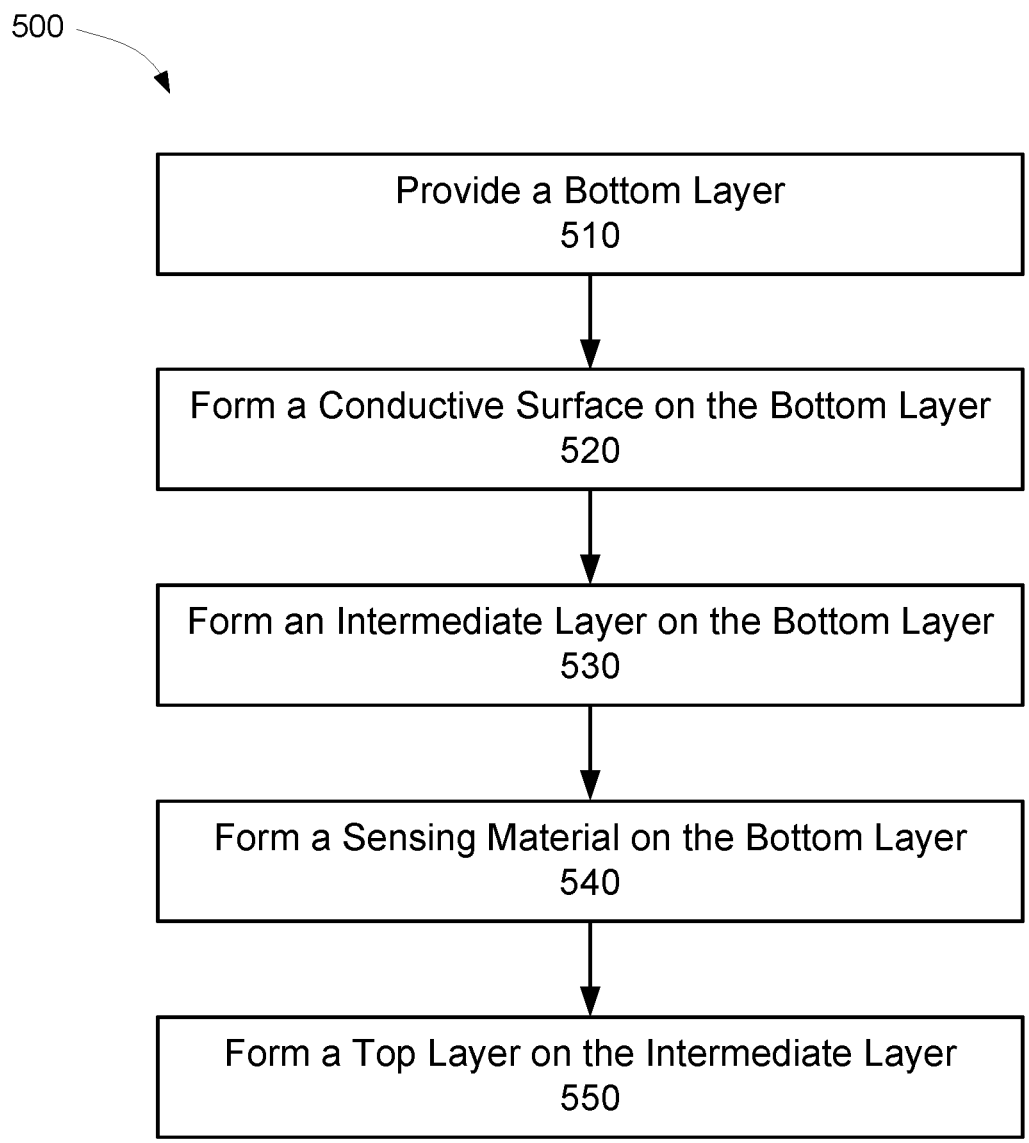
FIG. 5 is a flowchart representation of a method for forming a sensor, according to an exemplary embodiment of the present invention.

FIG. 5 is a flow-chart representation of an exemplary manufacturing method 500 of the present invention. In a step 510 a bottom layer is provided. The bottom layer can be conventionally formed of any of the suitable housing materials noted above. In some embodiments, the housing material is provided in a pre-made sheet and cut to desired dimensions. In various embodiments the bottom layer is on the order of 1 mm to 20 mm thick, though this range is not limiting. In those embodiments in which the bottom layer is provided by deposition of a suitable material, the deposition can be achieved by sputtering, chemical vapor deposition, spin coating, screen printing, etc. The bottom layer optionally can comprise a membrane.

In an optional step 520 an electrically conductive surface can be provided on the bottom layer, for example by activating the surface or by depositing an electrically conductive layer, like ITO, on one side of the bottom layer. The electrically conductive layer can be patterned to cover an area intended to be smaller than or coextensive with the footprint of the cavity, or an area greater than that needed to cover the footprint of the cavity, and in these instances can be further patterned to provide an electrical contact outside of the area intended for the cavity. The electrically conductive layer can be formed of any of the suitable materials noted above and can be formed by traditional patterning technologies such as masking followed by deposition and removal of the mask, or deposition followed by masking and etching, for example. In those embodiments that do not include step 520, another conductive surface is provided later in the method 500. In various embodiments, such as those described in greater detail below, the electrically conductive surface is patterned to comprise two electrically insulated portions, each providing an electrode to the sensor.

Method 500 further includes, after step 510 or after step 520 in those embodiments that include that step, a step 530 of forming an intermediate layer on the bottom layer, the intermediate layer having an aperture therethrough, wherein the aperture defines a cavity. In these embodiments step 530 can comprises providing a sheet of a material as the intermediate layer, cutting the aperture from the sheet, and adhering the sheet to the bottom layer, for example, using an adhesive. The cutting can be performed by die cutting or laser cutting, in various embodiments. In those embodiments in which the sensor includes a vent, the surface of the sheet can include a groove or dimple to provide a gap to become a vent. To make more than one sensor at a time, multiple apertures can be defined in the sheet, one aperture per sensor. In these embodiments the bottom layer provided in step 510 is sufficient in surface area to accommodate multiple sensors and the electrically conductive layer, if present, can be replicated for each sensor.

Method 500 further includes, after step 530, a step 540 of forming a sensing material on the bottom layer within the aperture of the intermediate layer. The sensing material can be formed of any of the suitable materials noted above. Some specific examples of forming an ionic sensing material are provided below. In the methods below, the sensing material can be placed as a liquid on the bottom layer within an aperture of the intermediate layer and then cured in situ, but in other embodiments the sensing material can be fabricated to an appropriate size and placed within the aperture.

In an exemplary step 520, a pre-polymer solution consisting of PEG diacrylate (PEGDA, $M_w$=575 g mol$^{-1}$) monomers, a photo initiator (PI) of 2-hydroxy-2-methylpropiophenone (HOMPP), and an ionic liquid are deposited within the aperture and then photo-crosslinked by exposure to an appropriate illumination, such as UV radiation, to form an ionic composite where the matrix material is a hydrogel. This UV-crosslinkable gel matrix is capable of forming microscopic patterns and structures with high spatial resolutions (down to submicrometer resolutions). Gelation of the polymer network can be achieved through UV exposure (e.g., at 365 nm, 12 mW cm$^{-2}$) for 20 seconds, which generates free radicals from the HOMPP that initiate the polymerization of acrylate-end groups presenting on PEGDA in the solution of [EMIM][TCM] (the ionic liquid). As a result, a flexible and transparent matrix can be formed, having a conductive ionic liquid incorporated within the polymeric network.

It is noted that the interfacial electrical properties of the ionic composite film depend on factors including the mixing ratio of the hydrogel composite (i.e., the ratio of matrix material to ionic liquid therein) and the dimensions of the thin-film layer, both of which play a role in the capacitive sensing characteristics. The relative amount of the ionic liquid determines the overall electrical conductivity, which directly influences the interfacial EDL capacitance. In addition, the EDL capacitance can be affected by varying the thickness of the film, which allows for further fine-tuning of the sensing specifications.

The EDL capacitance of such ionic composites is highly frequency-dependent, in which the unit-area capacitance decreases with a rising frequency. Although the capacitance-frequency curves of hydrogel composites exhibit similar trends to those of pure ionic liquids in general, the capacitance-frequency curves of the hydrogel composites exhibit decreasing capacitance at a given frequency as a function of decreasing the ionic liquid ratio. In particular, at a lower ionic liquid ratio (e.g., 25 wt %), the unit-area capacitance drops from 3.4 $\mu$F cm$^{-2}$ to 0.2 $\mu$F cm$^{-2}$, more than 10-fold reduction, as the frequency increases from 20 Hz to 1 kHz. In comparison, at a higher ionic liquid ratio of 67 wt %, the capacitance only reduces 57% from 6.1 $\mu$F cm$^{-2}$ to 2.6 $\mu$F cm$^{-2}$ during the same frequency sweep. Moreover, changing the ratio of the ionic liquid from 25 wt % to 67 wt % results in an appreciable increase in the interfacial capacitance from 3.4 $\mu$F cm$^{-2}$ to 6.1 $\mu$F cm$^{-2}$ at the same excitation frequency of 20 Hz.

Generally, a higher ionic liquid ratio leads to a larger interfacial capacitance, and thus, a higher device sensitivity. However, too high of an ionic liquid ratio can also result in an elastic modulus that is too low and a film that lacks structural integrity. Therefore, some embodiments employ a hydrogel composite with the ionic liquid ratio of 50 wt %; this ratio yields a suitable balance of mechanical strength, electrical conductivity, and EDL capacitance, specifically, a relatively high EDL capacitance of 5.4 $\mu$F cm$^{-2}$ at 20 Hz and a stable elastic modulus of 2.72 MPa for reliable and repeatable sensing applications.

Although the film thickness shows a marginal influence on the capacitance by comparison to the dependence on the mixing ratio, altering the film thickness from 10 $\mu$m to 100 $\mu$m does increase the EDL capacitance by 5.7% at 20 Hz. Processing a thinner film (e.g., 10 $\mu$m) can be more challenging, while a thicker film may lower the overall flexibility of the sensor. In some embodiments an ionic composite film thickness of 30 $\mu$m is used with an ionic liquid ratio of 50 wt %.

In further embodiments of the method 500, the method 500 further comprises an optional step 550 of forming a top layer on the intermediate layer. As discussed further below, in some embodiments the sensor lacks this layer, leaving the cavity open, and this step is omitted in those instances. In embodiments that include step 550 the top layer can be provided as a sheet of a suitable material, such as the same material as used for the bottom and/or intermediate layers, and joined to the intermediate layer to enclose the sensing material with a cavity formed by the aperture in the intermediate layer. Again, joining can be accomplished by use of an adhesive, for example. In some embodiments, step 550 further optionally includes forming a conductive surface on a side of the top layer before joining the top layer to the intermediate layer such that the conductive surface faces the sensing material in the cavity. The conductive surface can be formed by the methods noted in step 520, such as by activating the surface or depositing an electrically conductive film on the top layer. Those embodiments that do not include step 520 can instead include forming a conductive surface on a side of the top layer as part of step 550.

It will be appreciated that although the method has been described in terms of forming a succession of layers, some steps can be combined and/or rearranged. For example, the bottom layer and intermediate layer can be integrally formed by forming a sheet having cavities defined into one surface, such as by molding or embossing. Thereafter, the sensing material can be formed in those cavities in step 540.

Forming conductive layers in steps 520 and 550 can include utilizing emerging flexible electrode materials such as graphene, carbon nanotubes, and PEDOT:PSS for further improvements of interfacial capacitance. In particular, a PET film can serve as a bottom layer in step 510 and can be coated with graphene in step 520. Such graphene-based devices can exhibit a better capacitance-to-frequency response as compared to devices employing ITO.

Figure 6:
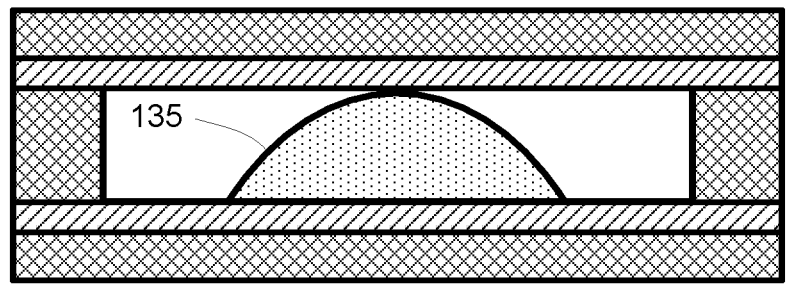
FIGS. 6-9 are cross-sectional views of four sensors according to further exemplary embodiments of the present invention.

Further embodiments are illustrated in the cross-sectional views of FIGS. 6-9. FIG. 6 illustrates both that the sensing material 135 can optionally comprise a dome shape, but also that the sensing material 135 need not be coextensive with the entire footprint of the cavity 110. In embodiments of the method 500, a dome can be formed in step 540. While the dome in the example of FIG. 6 just touches the top layer, in other embodiments the dome is shorter than the cavity's transverse dimension to provide a gap above the dome. The embodiment of FIG. 6 also can be used to illustrate that in some of the embodiments shown herein, the locations of the sensing and conductive materials in the structure can be reversed. In FIG. 6, for instance, the dome can instead by a liquid metal such as mercury, and serve as the electrically conductive material, and can be in contact with one or more sensing material layers.

Figure 7:
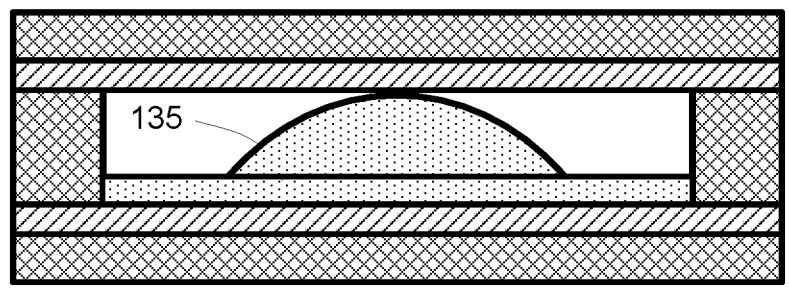
Figure 8:
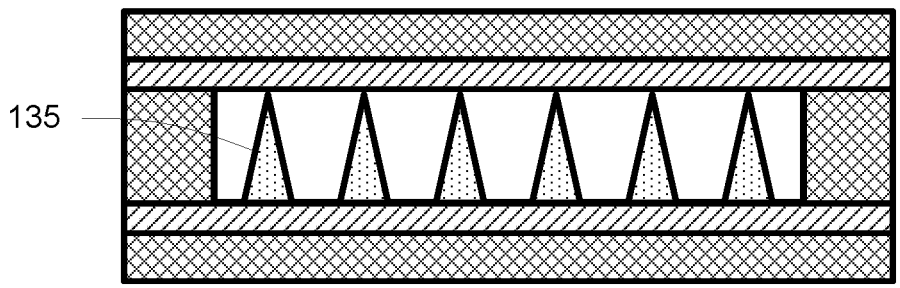

The embodiment shown in FIG. 7 combines a layer of sensing material with a dome of the same material formed on top of the layer. The embodiment shown in FIG. 8 illustrates that the sensing material, in some embodiments, can be in the form of multiple pillars, cones, domes, or the like arranged in an array, such as a square or hexagonal array, within the cavity. Such an array can be combined with a layer of sensing material analogously to FIG. 7.

Figure 10:
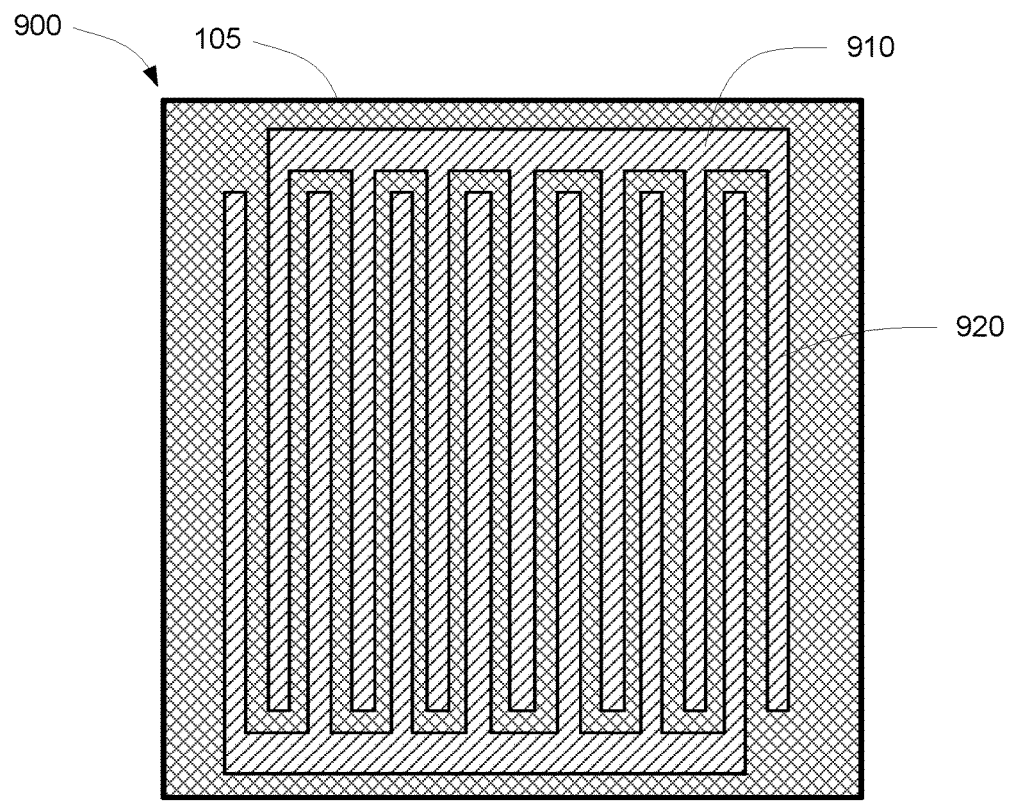
FIG. 10 is a bottom view of a top layer of FIG. 9.
Figure 9:
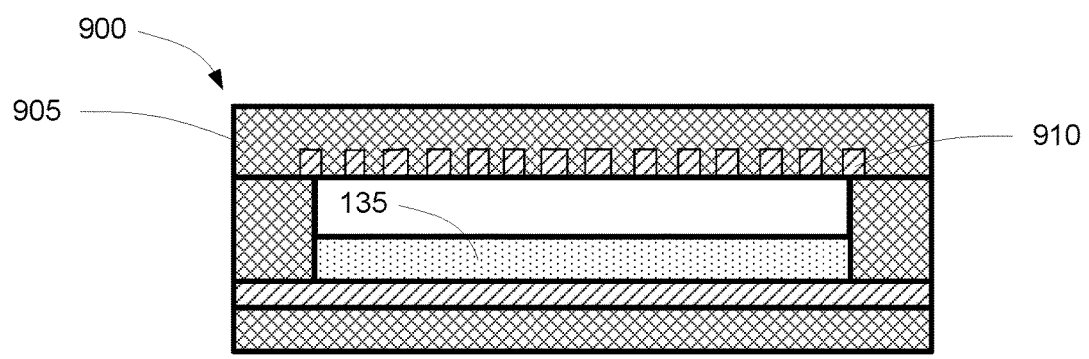

FIGS. 9 and 10 show, respectively, a cross-sectional view of a sensor 900 and a bottom view of the inside surface of a top layer 905 thereof. In this embodiment a conductive layer 910 (analogous to layer 150 in FIG. 1) is patterned, and in this example is patterned to form a set of interleaved parallel lines, or fingers 920. In the drawing, the two sets of unconnected and electrically independent interleaved fingers 920 provide two electrodes formed from one layer of conductive material. The interleaved fingers 920 can provide greater sensitivity, in some embodiments.

Figure 11:
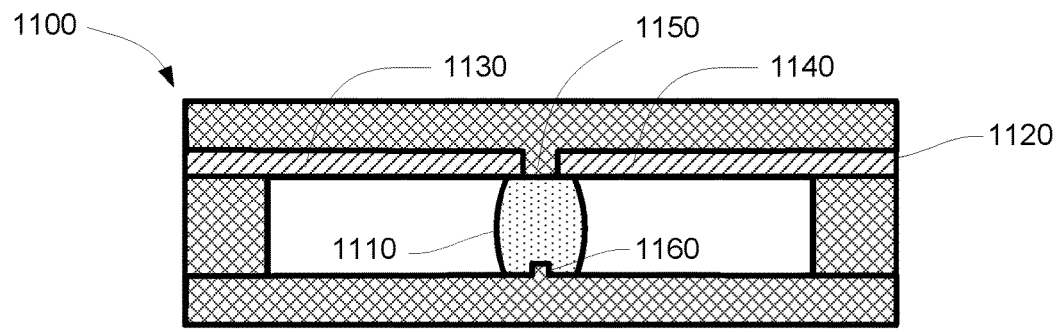
FIGS. 11-16 are cross-sectional views of six more sensors according to still further exemplary embodiments of the present invention.

FIG. 11 shows a cross-sectional view of still another exemplary sensor embodiment of the present invention. In the sensor 1100 of FIG. 11 the sensing material comprises a liquid droplet 1110, such as an ionic liquid or a salt solution. Like the sensor 900 of FIGS. 9 and 10, the sensor 1100 only includes one electrically conductive layer 1120 but that layer 1120 is divided into two electrically isolated portions 1130, 1140 to provide two electrodes, to further illustrate the point made above that a second electrode layer is optional in all of the previously described embodiments since a single layer can provide two electrodes. In this embodiment the electrically conductive layer 1130 is patterned to provide an electrically insulating gap 1150 positioned such that the droplet 1110 contacts portions 1130, 1140 on either side of the gap 1150.

The sensor 1100 optionally also includes an anchor 1160 to keep the droplet 1110 in place. The anchor 1160 in this instance comprises a protrusion of the housing material, rectangular in cross-section and extending perpendicular to the plane of the drawing. The anchor 1130 optionally spans the entire width of the cavity 110. Optionally, the single electrode in this embodiment can be on the bottom layer and deposited over the anchor 1160. In various embodiments the sensor 1100 includes a second anchor 1160 opposing the first anchor 1160 and extending from the opposing surface. In the method 500, either or both of the steps 510 and 550 can include forming the anchor 1160 as part of forming either or both of the bottom and top layers. Such protrusions can be created by molding or by adhering a strip of housing material to a sheet of the same. In still other embodiments the anchor 1160 is not a physical protrusion but instead a chemical modification to a surface of either the top or bottom layers.

Figure 12:
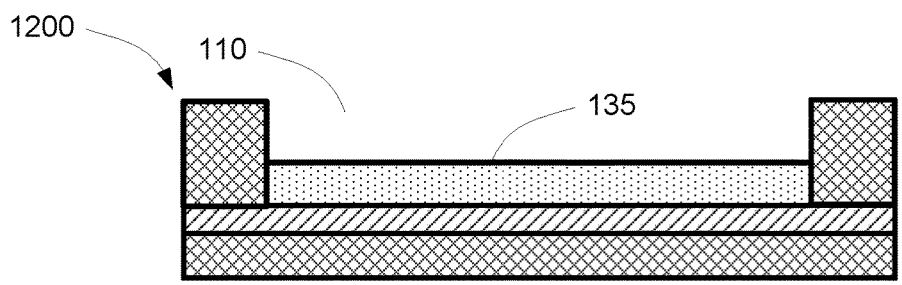

FIG. 12 shows a cross-sectional view of yet another exemplary sensor embodiment of the present invention. The sensor 1200 of FIG. 12 includes a cavity 110 that is open on one side. While the cavity 110 in sensor 1200 has a depth that is greater than a thickness of the sensing material 135, in other embodiments the depth of the cavity 110 and the thickness of the sensing material 135 are about the same. A sensor 1200 can be created by omitting step 550 from method 500, for example.

Figure 13:
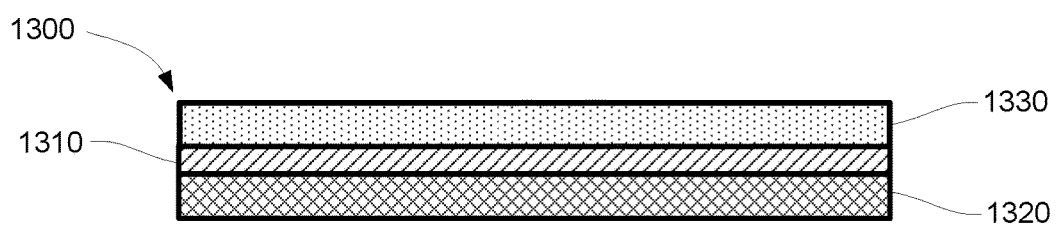

FIG. 13 shows a cross-sectional view of still yet another exemplary sensor embodiment of the present invention. The sensor 1300 consists only of a three-layer assembly of a conductive material layer 1310, a substrate layer 1320, and a sensing material layer 1330. In the illustrated embodiment the conductive material layer 1310 is sandwiched between the substrate layer 1320 and sensing material layer 1330. In the method 500, this structure can be made by omitting steps 530 and 550, for instance. In other embodiments the sensing material layer 1330 can be between the substrate layer 1320 and the conductive material layer 1310. The substrate layer 1320 can comprise any of the suitable materials for a housing layer in the embodiments above.

Figure 4:
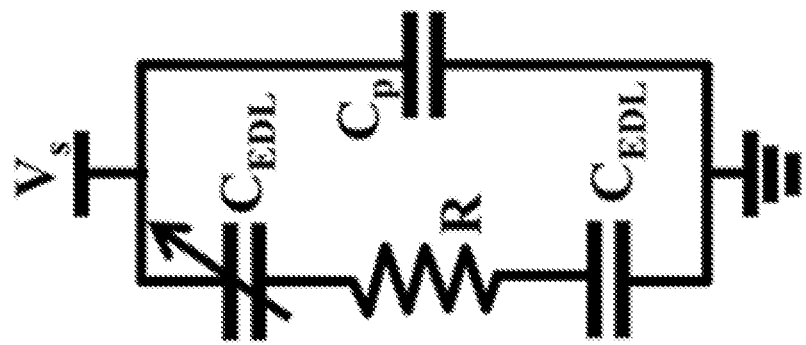
FIG. 4 is a schematic electrical circuit equivalent to various embodiments of the present invention.

Some embodiments of the sensor 1300 can be applied to a conductive surface by attaching the sensing material layer 1330 side of the sensor 1300 thereto. Whereas the circuit of FIG. 4 is completed through the conductive surfaces 125, 145 of FIG. 3 with one connected to ground and the other to a voltage source, the same circuit is achieved in sensor 1300 by using the conductive surface to which the sensor 1300 is attached as the second electrode. Thus, the sensor 1300 can be applied to surfaces made of metals and conductive polymers, but also poorer electrical conductors such as skin and other tissues, both human and animal. The contact area between the sensing material layer 1330 and the surface to which it is attached can change in response to an applied load. Like other embodiments described herein, the size and shape of the sensor 1330 can be formed to fit various body parts including curved parts such as tips of fingers. As with prior embodiments, the conductive material layer 1310 can also be divided into two portions, electrically insulated from each other, to provide two electrodes. In still additional embodiments the sensing material layer 1330 is sandwiched between the conductive material layer 1310 and the substrate layer 1320. Still further embodiments do not need the substrate layer 1320 as the combination of the conductive material layer 1310 and the sensing material layer 1330 provide sufficient structural integrity.

Figure 14:
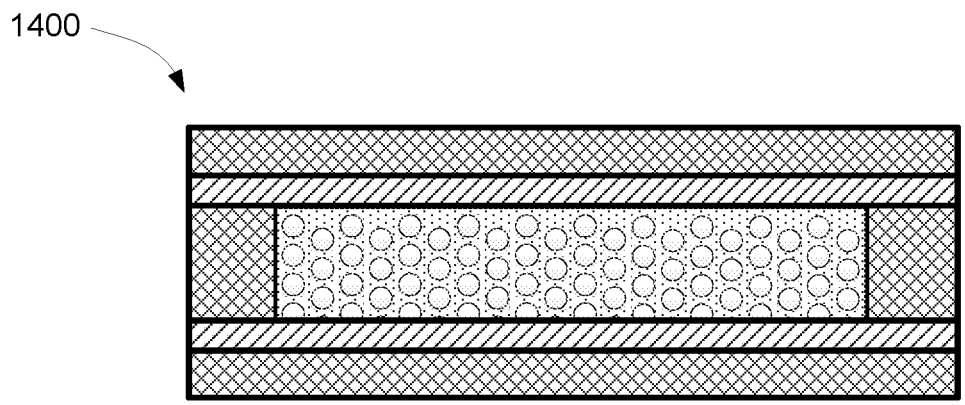

FIG. 14 shows a cross-sectional view of still yet another exemplary sensor embodiment of the present invention. The sensor 1400 is analogous to the sensor 100 of FIGS. 1 and 2 except that the cavity 110 in this embodiment is completely filled with the sensing material 135. In some of these embodiments the sensing material 135 comprises an ionic composite having a porous structured material as the matrix material, such as a micro-structured polymer matrix, a hollow sphere foam, fabric, or paper.

Figure 15:
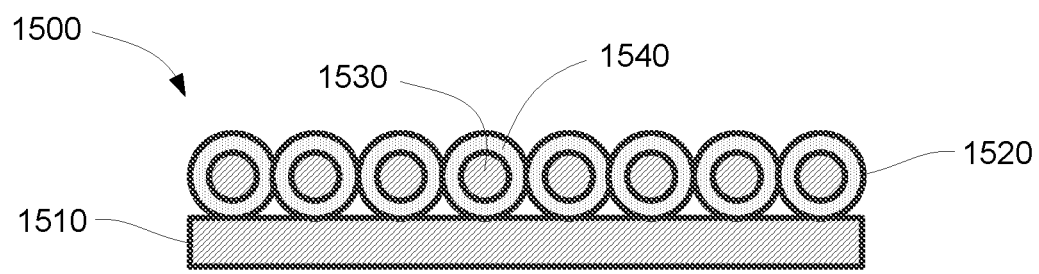
Figure 16:
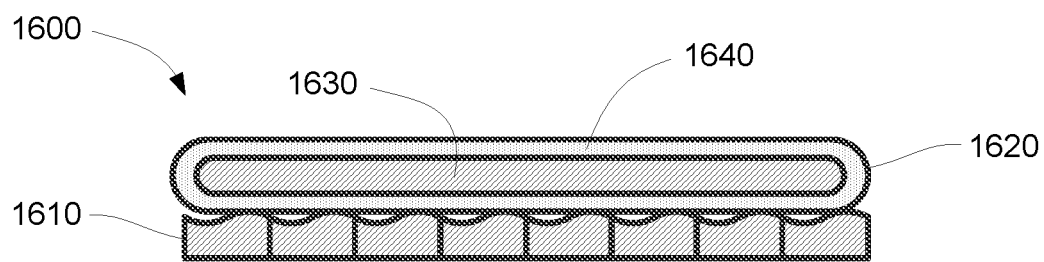

FIGS. 15 and 16 show cross-sectional views of two additional exemplary sensor embodiments 1500 and 1600 of the present invention. These embodiments, like the one in FIG. 13, lack a cavity. Additionally, a flexible conductive layer 1510, 1610 provides one electrode and structural support in place of the top and/or bottom layers of housing material in prior embodiments. The sensing material 1520, 1620, is disposed on one or both sides of the conductive layer 1510, 1610.

The sensing material 1520, in the embodiment of FIG. 15, comprises a plurality of coated conductive strands 1530, where the coating 1540 on the strands comprises an ionic material. The strands 1530 can be woven as a fabric in some embodiments. The strands 1530 are electrically connected to form a second electrode opposite the first electrode provided by the conductive layer 1510, and a variable capacitance is formed between these electrodes, across the coating 1540 disposed between the two electrodes. A load applied to the sensor 1500 will deform the structure and alter the contact areas between coating 1540 and the conductive layer 1510, as well as the spacings between the strands 1530 and the shapes of the strands 1530, such as by bending, all of which can contribute to a variable capacitance that varies as a function of applied load. As in the case of the embodiment of FIG. 13, some embodiments of sensor 1500 lack the conductive layer 1510, as the sensing material 1520 itself provides sufficient structural support. In these further embodiments, a conductive surface, like skin, can provide an electrode in place of the conductive layer 1510.

The sensing material 1620, in the embodiment of FIG. 16, comprises a conductive tape or other thin conductive substrate 1630 coated on one or both sides with a coating 1640 comprising an ionic material. FIG. 16 also illustrates that in various embodiments the flexible conductive layer 1510, 1610 can itself include a textured surface contacting the sensing material 1520, 1620 to provide greater surface area contact generally, and can also affect the rate of change of the area of contact as a function of an applied pressure. The substrate 1630 forms a second electrode opposite the first electrode provided by the conductive layer 1610, and a variable capacitance is formed between these electrodes, across the coating 1640 disposed between the two electrodes. A load applied to the sensor 1600 will deform the structure and alter the contact area between coating 1640 and the conductive layer 1610, as well as the shape of the substrate 1630, such as by bending and twisting, all of which can contribute to a variable capacitance that varies as a function of applied load. As above, some embodiments of sensor 1600 lack the conductive layer 1610, because the sensing material 1620 itself provides sufficient structural support, and a conductive surface, like skin, can provide the other electrode.

The present invention also includes consumer electronic devices, i.e., smart watches, augmented reality glasses, and custom fingertip-mounted tactile sensors, each including one or more sensors as described above. Important design aspects for this type of human-machine interface include both flexibility to fit onto the curved and deformable body surface and the ability to be tailored to a suitable sensitivity for a targeted contact pressure range. For instance, a sensor with an overall dimension of 20×10×0.2 mm$^3$ and a device sensitivity of 3.1 nF kPa$^{-1}$ in a detection range between 1 kPa-5 kPa has been implemented. A sensor integrated into a smartwatch can detect blood pressure waveforms of a radial artery. Likewise, the blood pressure from a person's temple can be measured with a sensor mounted on augmented reality glasses. Furthermore, a fingertip-mounted sensor with a 2×3 array of pixels, each pixel being a discreet sensor, at a spatial resolution of 2.3 mm has been applied to resolve fine surface topology, such as Braille letters.

Also, the sensors of the present invention offer an unprecedented high-capacitive value (in the order of 10 μF cm$^{-2}$) and device sensitivity (up to 3.1 nF kPa$^{-1}$), which increases their signal-to-noise ratio, allowing them to perform well under environments with high-electrical noises, for example, when used to sense pressure changes under water or in a humid environment.

The use of the term "means" within a claim of this application is intended to invoke 112(f) only as to the limitation to which the term attaches and not to the whole claim, while the absence of the term "means" from any claim should be understood as excluding that claim from being interpreted under 112(f). The terms "top" and "bottom" are used herein, like "first" and "second," as arbitrary labels to distinguish different layers from one another.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A sensor comprising:
   a housing defining a cavity therein, the housing including a top layer disposed between the cavity and the external environment of the housing, the top layer including a first membrane having an electrically conductive surface facing the cavity; and
   a solid layer of a patterned sensing material within the cavity, the sensing material being in contact with the electrically conductive surface of the first membrane.

2. A sensor consisting of:
   a three-layer assembly of
      a substrate layer;
      a sensing material layer including an ionic material; and
      a conductive material layer in contact with the sensing material layer.

3. The sensor of claim 2 wherein the conductive material layer is patterned to form two electrically isolated portions.

4. The sensor of claim 2 wherein the conductive material layer is disposed between the substrate layer and the sensing material layer.

5. A sensor consisting of:
   a conductive material layer; and
   a sensing material layer including an ionic material in contact with the conductive material layer.

6. The sensor of claim 5 wherein the sensing material layer comprises a plurality of coated conductive strands, wherein the coating on the strands comprises the ionic material.

7. The sensor of claim 6 wherein the plurality of strands comprises a fabric.

8. The sensor of claim 6 wherein the sensing material layer comprises a coated tape, wherein the coating on the tape comprises the ionic material.

* * * * *